United States Patent
Hus et al.

(10) Patent No.: US 8,730,858 B2
(45) Date of Patent: *May 20, 2014

(54) METHOD AND DEVICE FOR SENSITIVITY COMPENSATION

(75) Inventors: Olivier J. M. Hus, Redhill (GB);
Matthew P. J. Baker, Canterbury (GB);
Timothy J. Moulsley, Caterham (GB)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,554

(22) Filed: Dec. 9, 2011

(65) Prior Publication Data

US 2012/0082080 A1    Apr. 5, 2012

Related U.S. Application Data

(63) Continuation of application No. 11/909,474, filed as application No. PCT/IB2006/050921 on Mar. 27, 2006, now Pat. No. 8,094,598.

(30) Foreign Application Priority Data

Mar. 29, 2005   (GB) .................................. 0506279.9

(51) Int. Cl.
*G08C 17/00*    (2006.01)

(52) U.S. Cl.
USPC .......................................... 370/311; 370/312

(58) Field of Classification Search
None
See application file for complete search history.

(56) References Cited

U.S. PATENT DOCUMENTS

| | | | |
|---|---|---|---|
| 2003/0067964 A1* | 4/2003 | Li ................................. | 375/141 |
| 2003/0086366 A1* | 5/2003 | Branlund et al. ............. | 370/208 |
| 2003/0220085 A1 | 11/2003 | Khawand et al. | |
| 2005/0047359 A1 | 3/2005 | Sebire | |
| 2005/0193309 A1 | 9/2005 | Grilli et al. | |
| 2006/0126590 A1 | 6/2006 | Putcha et al. | |

FOREIGN PATENT DOCUMENTS

| WO | 2004030383 A1 | 4/2004 |
|---|---|---|

OTHER PUBLICATIONS

3GPP: "25.346 CR 010 Frequency Layer Dispersion in MBMS", 3GPP TSG-RAN WG2 Meeting 46, [Online], Feb. 18, 2005, XP002415989.

* cited by examiner

*Primary Examiner* — David Oveissi

(57) ABSTRACT

When a radio station terminates a first service on a first radio frequency channel and selects a second radio frequency channel for engaging in a second service, a time delay is inserted after the termination of the first service and before selecting the second radio frequency channel or before engaging in the second service. The time delay is dependent on the state of the radio station and/or a characteristic of the second service.

18 Claims, No Drawings

METHOD AND DEVICE FOR SENSITIVITY COMPENSATION

This application claims the benefit or priority of and describes the relationships between the following applications: wherein this application is a continuation of application Ser. No. 11/909,474 filed Sep. 24, 2007 (now U.S. Pat. No. 8,094,598) which is a 371 of International application No. PCT/BI2006/050921 filed Mar. 27, 2006, which claimed priority of EP 0506279.9 filed Mar. 29, 2005.

The invention relates to a method of operating a radio station. The invention has application in, particularly but not exclusively, mobile terminals suitable for use in a mobile communication system such as UMTS (Universal Mobile Telecommunication System) or cdma2000.

Multimedia Broadcast and Multicast Services (MBMS) are currently being introduced to the UMTS specifications Release 6. This will enable efficient delivery of multimedia services to multiple mobile terminals simultaneously. In UMTS, a mobile terminal is referred to as a User Equipment, or UE.

One feature currently under specification is Frequency Layer Convergence (FLC) where the network sends an indication of a preferred frequency (also referred to as a "preferred layer", PL) for a point-to-multipoint MBMS service, so that UEs that intend to join a particular service switch to the PL of that service in order to receive the service. As a result, the number of UEs gathered on the same frequency for the purpose of receiving an MBMS service may be quite high.

When a high number of UEs is receiving the same point-to-multipoint MBMS service on the same PL, they will be camping on that frequency for the duration of the MBMS session. Once the transmission of the MBMS service has stopped, the UEs will start signalling on the network for their next service, for example making a call, receiving a short message service (SMS), or subscribing to another MBMS service. Some UEs may be able to receive simultaneously a MBMS service together with another service such as a dedicated or point-to-point service (e.g. voice call). In the case of a UE that would not be able to receive both simultaneous services, it might have to reduce its data rate on the non-point-to-multipoint MBMS service in order to receive the MBMS service. When the MBMS service terminates, the UE would then have to start signalling in order to increase its data rate again and restart the non-MBMS service.

As the network will have to handle this signalling and the corresponding next services for previously MBMS-subscribed UEs on the same preferred frequency they were camping on for the reception of the MBMS service, a network overload may occur on that frequency at the end of the MBMS session.

One possibility for alleviating this problem is to force the UEs to move to other frequencies as soon as an MBMS session ends, so that the signalling load for the next services is spread over several frequencies. This can be done by the use of a single-bit Frequency Dispersion Indicator, which would indicate to UEs that they have to select and move to another frequency before continuing with setting up their next service.

However, when dispersion happens it would apply to all UEs instantly when an MBMS session on a PL stops, and as a result this process of dispersion may create further problems. An overload of network signalling may occur as a result of a large number of UEs simultaneously selecting alternative frequencies and switching to them. Also, unnecessary dispersion could take place for UEs that would next be starting to receive a different MBMS service on the same PL; such UEs would have to go through two successive cell reselection procedures, one to disperse after the first MBMS session, and another to re-converge for the next MBMS session.

An object of the invention is to reduce the risk of signalling overload when a point-to-multipoint service ends.

According to the invention there is provided a method of operating a radio station comprising:
terminating a first service on a first radio frequency channel;
selecting a second radio frequency channel; and
engaging in a second service on the second radio frequency channel;
wherein at least one of selecting the second radio frequency channel and engaging in the second service occurs after a time period, relative to the termination of the first service, dependent on at least one of a state of the radio station and a characteristic of the second service.

The present invention reduces the risk of overloading and/or increased signalling on all frequencies when a point-to-multipoint service transmission ends, by applying a configurable time delay to the frequency dispersion mechanism based on a prioritisation scheme linked to the current state of the radio station or a characteristic of a following service.

Optionally the state of the radio station is one of: an idle mode in which the radio station does not receive any service, an active mode in which the radio station receives a point-to-point service, an active mode in which the radio station receives a point-to-multipoint service.

Optionally the characteristic of the second service is a priority level of the second service. Optionally the characteristic of the second service is the provision of a point-to-point service or a point-to-multipoint service.

Embodiments of the invention will now be described. When a UE engages in a second service following the termination of a first service, the selection by the UE of a radio frequency channel for the second service, or the engagement by the UE in the second service, occurs after a time period relative to the termination of the first service. This time period is dependent on a state of the radio station or on a characteristic of the second service, or on both. As a result the dispersion procedure does not occur instantly for all UEs but takes a certain time depending on the UE's own state transition procedures. This introduces an element of time delay to the frequency dispersion process, resulting in a relative spread over time of the signalling involved in the frequency reselection and/or service transition, and a reduction in network overloading, as well as avoiding unnecessary frequency reselections. For some state transitions the time period may be zero, resulting in immediate frequency dispersion, whilst for other state transitions the time period may be non-zero.

In one example of state transitions the UE will, after the end of the MBMS service transmission, perform a frequency dispersion procedure if it is transitioning to a point-to-point service (such as receiving a voice call or sending an SMS), and will not perform a frequency dispersion procedure if it suspends all activity and goes into idle mode. So according to the invention, the time period for performing the state transition after the end of the end of the MBMS service depends on the next state, in this example either idle mode or a point-to-point service.

Another example of state transitions in which different time periods for the dispersion procedure are used is as follows:
a) If the UE moves to a non-MBMS service, such as a point-to-point service, immediately perform a frequency dispersion procedure b) If the UE moves to an idle mode, perform a frequency dispersion procedure after a time delay
c) If the UE subscribes to another MBMS service (point-to-multipoint):
  If the MBMS service is on the same PL, do not perform the frequency dispersion procedure
  If the MBMS service is on the same PL, perform cell re-select for that PL
  If no PL is indicated for the new MBMS service, perform the frequency dispersion procedure
  If a PL different from the current frequency is indicated for the new MBMS service, perform frequency dispersion direct to the indicated PL.

Optionally, the procedures under item c) above may be applied if (and only if) the next MBMS service is scheduled to commence within a predetermined time period after the end of the recently-finished MBMS session.

In a further example, different time delays for frequency dispersion may be realised by setting different time delays in random access procedures. The random access procedures for a UE that is required to back off for a random time period if its first random access attempt fails may be modified in one or more of the following ways when the UE has just finished receiving an MBMS session:

a) The back-off time after a failed random access attempt by a UE may have different properties (e.g. mean duration or minimum duration) depending on the current state or next action of the UE.
b) A UE, depending on its current state or next action, may be required to apply a delay before its first random access attempt after an MBMS session terminates. This delay may be pre-determined or variable, and may be the same as, or different from, or calculated from, the back-off time for subsequent random access repeat attempts.
c) The delay before the first random access attempt, and/or the duration of the back-off time for subsequent random access attempts, may be set according to the class of service for which the UE is using the random access channel. Thus a UE wishing to commence a higher-priority service after the end of an MBMS session may start its frequency dispersion earlier than a UE wishing to commence a lower-priority service.

The timing of the time periods for the frequency dispersion procedure may be triggered in response to an external stimulus, for example:
i) a received protocol message indicating a start, change or update of a service, or
ii) receipt of data in a buffer to awaken a UE in idle mode, or
iii) receipt of a paging indicator (for a dedicated service or an MBMS service) which informs the UE of an impending transmission.

Various known frequency dispersion procedures may be triggered by the schemes described above. Examples include:
  randomly select a new frequency
  select the strongest signal frequency (including the current frequency)
  select the strongest signal frequency (excluding the current frequency)
  select the previous frequency on which the UE was camped before moving to the current frequency
  some combination of the above.

Although the invention has been described with reference to UMTS, the invention is not limited to UMTS but can be used in other radio communication systems requiring selection of frequencies for reception of data services.

In the present specification and claims the word "a" or "an" preceding an element does not exclude the presence of a plurality of such elements. Further, the word "comprising" does not exclude the presence of other elements or steps than those listed. The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

The invention claimed is:

1. A method of operating a radio station in a communication system that utilizes a frequency dispersion mechanism to reduce the risk of overloading and/or increased signaling on all frequencies when a point-to-multipoint service transmission is simultaneously terminated for a plurality of mobile terminals, the method comprising for each of said plurality of mobile terminals:
  terminating a first service on a first radio frequency channel;
  selecting a second radio frequency channel;
  engaging in a second service on the second radio frequency;
  performing a frequency dispersion procedure after a configurable time delay relative to the termination of the first service, wherein the configurable time delay is based on a prioritization scheme linked to at least one of a current state of the radio station, a next state of the radio station and a characteristic of the second service to be engaged in following the termination of the first service.

2. The method according to claim 1, wherein said second service is one of: a point-to-point service, an idle mode, a second point-to-multipoint service.

3. The method according to claim 1, wherein frequency dispersion is not performed where the second service is a second point-to-multipoint service and a preferred frequency of the second point-to-multipoint service is specified by a network in which the radio station operates in.

4. The method according to claim 1, wherein the current state of the radio station is one of: an idle mode in which the radio station does not receive any service, an active mode in which the radio station receives a point-to-point service, or an active mode in which the radio station receives a point-to-multipoint service.

5. The method as claimed in claim 1, wherein the characteristic of the second service is a priority level of the second service.

6. The method as claimed in claim 1, wherein the characteristic of the second service is the provision of a point-to-point service or a point-to-multipoint service.

7. The method as claimed in claim 6, wherein the mobile radio station operates in a UMTS system.

8. The method as claimed in claim 1, wherein the radio station a mobile radio station.

9. The method as claimed in claim 1, wherein the mobile radio station operates in a CDMA2000 system.

10. The method as claimed in claim 1, wherein the frequency dispersion procedure is realized by setting different time delays for the plurality of mobile terminals based on random access procedures.

11. The method as claimed in claim 10, wherein the random access procedures for a mobile terminal modify a first random access attempt by applying a delay before attempting said first random access attempt.

12. The method as claimed in claim 11, wherein the delay is set according to a class of service for which the mobile terminal is using a random access channel.

13. The method as claimed in claim 11, wherein the delay is one of a pre-determined delay or variable delay.

14. The method as claimed in claim 10, wherein the random access procedures for a mobile terminal set the mean duration or minimum duration of a back off time depending on the current state or a next action of the mobile terminal.

15. The method as claimed in claim 10, wherein the random access procedures for a mobile terminal set the mean duration or minimum duration of a back off time depending on the current state or a next action of the mobile terminal.

16. The method as claimed in claim 10, wherein the random access procedures for a mobile terminal set a time period for the frequency dispersion procedure in accordance with an external stimulus selected from the group consisting of: a received protocol message indicating a start, change or update of a service, a receipt of data in a buffer to awaken the mobile terminal in an idle mode, a receipt of a paging indicator for a dedicated service or a point-to-multipoint service which informs the mobile terminal of an impending transmission.

17. A radio station for use in a communication system that utilizes a frequency dispersion mechanism to reduce the risk of overloading and/or increased signaling on all frequencies when a point-to-multipoint service transmission is simultaneously terminated for a plurality of mobile terminals, the radio station being configured to perform the acts of:
    (a) terminating a first point-to-multipoint service on a first radio frequency channel;
    (b) performing one of a plurality of transitions including:
        (i) transitioning from said terminated first point-to-multipoint service to a point-to-point service and immediately performing a frequency dispersion procedure;
        (ii) transitioning from said terminated first point-to-multipoint service to an idle mode and performing a frequency dispersion procedure after a time delay;
        (iii) transitioning from said first terminated point-to-multipoint service to a second point-to-multipoint service on the same frequency as the terminated first point-to-multipoint service without performing a frequency dispersion procedure in the case where the preferred frequency of the second point-to-multipoint service is specified by the network;
        (iv) transitioning to a second point-to-multipoint service on the same preferred frequency as the terminated first point-to-multipoint service and performing a frequency dispersion procedure in the case where the preferred frequency of the different point-to-multipoint service is not specified by the network;
        (v) transitioning to a second point-to-multipoint service on a different preferred frequency from the terminated first point-to-multipoint service and if the preferred frequency for the second point-to-multipoint service is specified by the network, performing a frequency dispersion procedure directed to the different preferred frequency;
    wherein a configurable time delay is applied to the frequency dispersion procedure based on a prioritization scheme linked to at least one of the current state of the radio station and a characteristic of the second service to be engaged in following the termination of the first service, and
    wherein a current state of the radio station is one of:
        an idle mode in which the radio station does not receive any service,
        an active mode in which the radio station receives a point-to-point service, or
        an active mode in which the radio station receives a point-to-multipoint service.

18. A radio station for use in a communication system that utilizes a frequency dispersion mechanism to reduce the risk of overloading and/or increased signaling on all frequencies when a point-to-multipoint service transmission is simultaneously terminated for a plurality of mobile terminals, the radio station being configured to perform the acts of:
    terminating a first service on a first radio frequency channel;
    selecting a second radio frequency channel;
    engaging in a second service on the second radio frequency;
    performing a frequency dispersion procedure after a configurable time delay relative to the termination of the first service, wherein the configurable time delay is based on a prioritization scheme linked to at least one of a current state of the radio station, a next state of the radio station and a characteristic of the second service to be engaged in following the termination of the first service.

* * * * *